Figure 1:
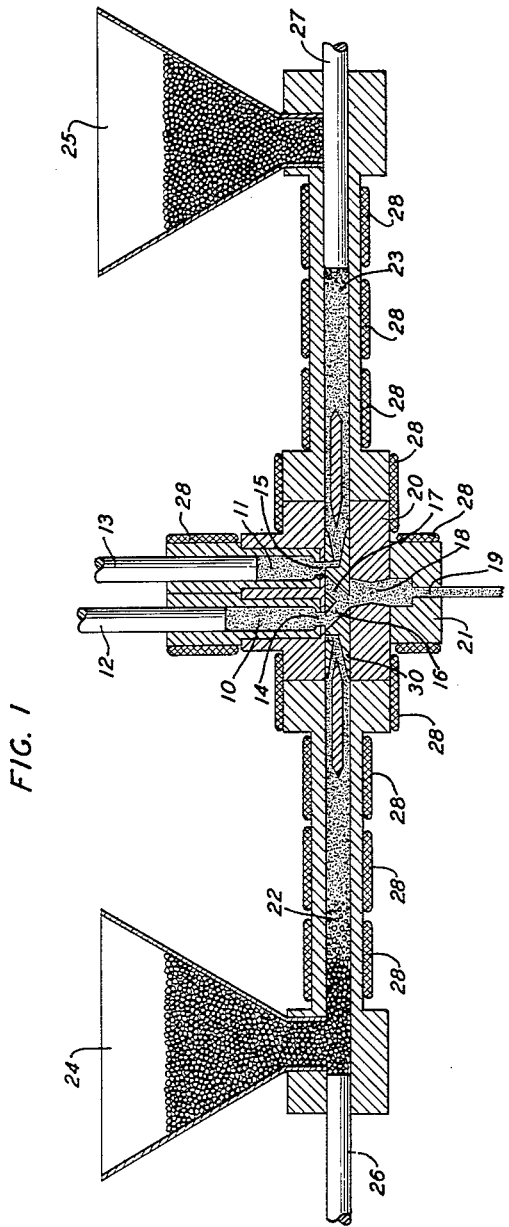

Dec. 1, 1964   R. F. WESTOVER   3,158,901
CONTINUOUS EXTRUDER

Filed Feb. 8, 1963   2 Sheets-Sheet 1

INVENTOR
R. F. WESTOVER
BY
ATTORNEY

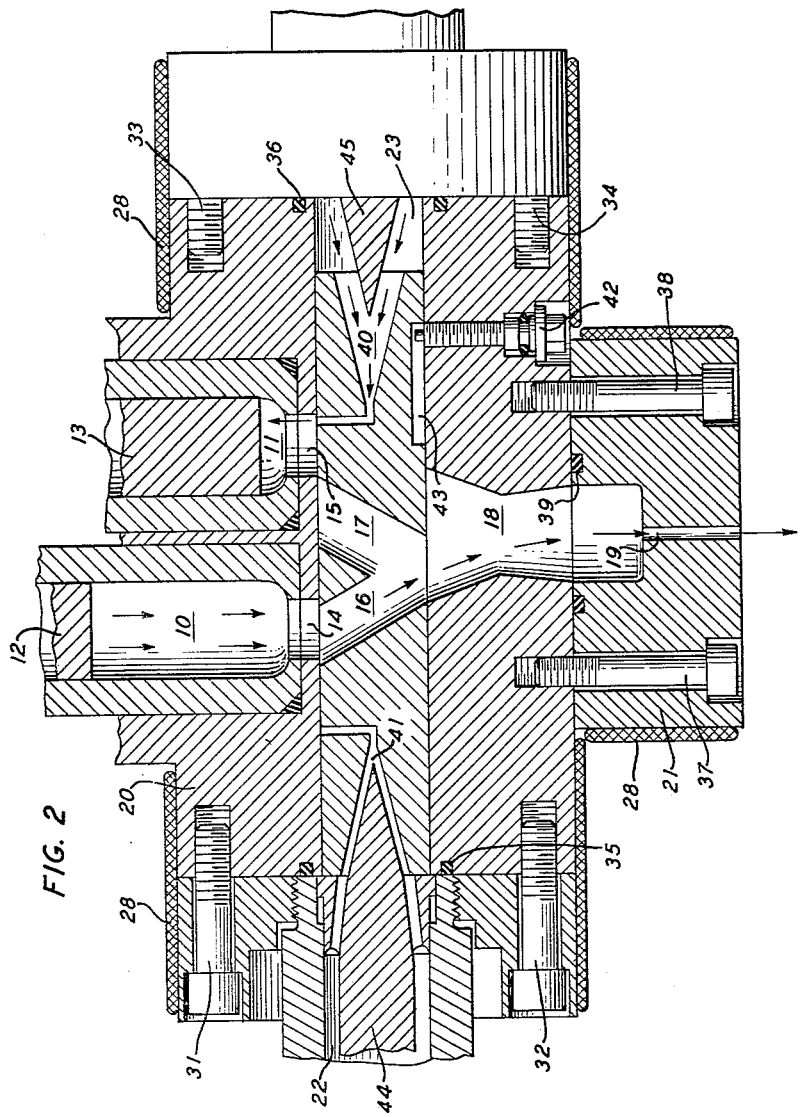

United States Patent Office 3,158,901
Patented Dec. 1, 1964

3,158,901
CONTINUOUS EXTRUDER
Robert F. Westover, Princeton, N.J., assignor to Bell Telephone Laboratories, Incorporated, New York, N.Y., a corporation of New York
Filed Feb. 8, 1963, Ser. No. 257,240
2 Claims. (Cl. 18—12)

This invention relates to extrusion devices particularly adapted for the extrusion of plastics.

The present trend in plastics is toward the utilization of higher molecular weight materials. This is especially true in applications where such factors as stress cracking are important. The higher apparent viscosities of these materials have caused extrusion processing problems beyond those normally encountered with the lower molecular weight materials. Principal among these is the problem of degradation of the material due to excessive mechanical working.

Considerable activity has been devoted to improving the design of the conventional type screw extruder to develop greater flow rates and increased pressures. An unavoidable consequence of this is a greater degree of shearing of the extrudate. This mechanical working tends to degrade the material. An alternative extruder design in which the screw has been eliminated is described and claimed in application Serial No. 236,324 filed November 8, 1962, and now Patent No. 3,123,861. However, this extruder also relies upon shear forces acting on the plastic to generate the necessary pressure.

In contrast to these extruders in which the pressure relies on shearing forces, there is the ram-type extruder which is simple in design and operation. The ram pump is still being used successfully for the extrusion of molten metals and some plastics, for high pressure capillary rheometers and for injection machines. The pressure-developing ability of a ram pump is practically unlimited and is little affected by the viscosity medium being pumped. Therefore, the extrusion process is dependent predominantly upon the flow behavior of the medium in the region of the extrusion die. The temperature of the material has no effect upon the extrusion pressure and, therefore, affects the output only with regard to the flow behavior at the die.

The ram extruder's chief disadvantages have been its discontinuous output, its prohibitive heating times for media such as plastics, which require heat plasticization prior to extrusion, and for the difficulty of allowing air or other undesirable gases to remain trapped in the viscous media.

The elimination of these disadvantages according to the present invention has resulted in an extruder with essentially independent control of temperature and pressure, fast equilibrium response to changes in extrusion pressure and reduced shear degradation of the material.

These and other aspects of the invention will become more apparent from a consideration of the drawing in which:

FIG. 1 is a front sectional view of a plastics extruder constructed according to this invention; and FIG. 2 is a front section showing the valve arrangement in greater detail.

The continuous flow operation of the extruder of this invention is maintained by at least two alternating feed paths which are conveniently mounted side by side as in FIG. 1. In FIG. 1 there is shown two cylindrical feed chambers 10 and 11. Fitted within each of said chambers are pistons or rams 12 and 13 which, when displaced downwardly, express the feed material through the lower outlets 14 and 15 into converging channels 16 and 17 which communicate through a common conduit 18 with the die 19. This portion of the assembly is contained in a support block 20 and die block 21. Mounted adjacent opposing sides of the support block are means for feeding the feed chambers. These consist of tubular feed conduits 22 and 23 providing with hoppers 24 and 25 for introducing the plastic into the feed conduits and pistons or rams 26 and 27 for urging the feed material into the feed cylinders 10 and 11. Most plastic materials are solid at room temperature and must be heated above the softening point for extruding. For this purpose a series of electrical heating pads each designated by numeral 28 are provided at appropriate points along the assembly to maintain the flow path at the desired temperature.

The proper feeding and expressing of material from the extruder relies heavily on the shuttle valve indicated generally at 30. The design and operation of this valve is shown in greater detail in FIG. 2. FIG. 2 shows the cylindrical feed cylinders 10 and 11 which are supported by the support block 20. Secured to each side of the support block with the aid of bolts 31, 32, 33 and 34 are the terminal portions of the feed conduits 22 and 23. O-rings 35 and 36 provide a seal at the joint. Formed in the lower portion of the support block 20 is the common exit channel 18. The die block 21 is fastened by bolts 37 and 38 at the base of the support block. O-ring 39 maintains the seal.

The shuttle valve indicated at 30 directs both the feed pattern and the output flow path. With the shuttle in the position indicated feed material is being introduced through the conduit 23 under the influence of piston 27 (FIG. 1). At this time piston 26 and feed conduit 22 are inactive. The piston 27 forces the plastic through the passage 40 formed in the shuttle valve and thereafter through port 15 into the feed chamber 11. Note that the other feed conduit 22, which communicates with passage 41, terminates in a blind when the shuttle valve is in this position. The pressure of piston 27 continues to force material into the chamber 11 until the piston 13 reaches the top of its stroke. The lower portion of the feed chamber 11 does not communicate with the die so that no material can be discharged from chamber 11 with the valve in this position.

Operating concurrently with this feed cycle is the discharge of feed chamber 10. Piston 12 is activated and, with the shuttle valve 30 in the position shown, its contents are discharged through the conduit 16 into the central exit channel 18 and expressed through the die 19.

Referring again to FIG. 1, during this same cycle the inactive piston 26 is withdrawn to a position which permits refilling of the feed conduit 22.

When the material in feed chamber 10 is essentially completely discharged, the changeover to chamber 11 is effected. This occurs by displacing the shuttle valve 30 to the right-hand position. The shuttle valve is actuated according to the relative pressures in the feed conduits 22 and 23. Its operation is fully automatic in this respect and no direct mechanical actuating means is required. The feed pressure in conduit 22 is raised by energizing piston 26. The piston 27 is de-energized and removed to a position permitting refill of the conduit 23 from hopper 25. This relative pressure change displaces the valve to the right, a position which corresponds to the mirror image of that illustrated. The operation of the extruder in this position is correspondingly the same as that previously described. The set screw 42 engages the slot 43 to prevent rotation of the shuttle and provide the proper communication between the conduits of the shuttle valve and the appropriate channels of the assembly. Torpedoes 44 and 45, of conventional design, are included to improve the heat transfer to the plastic.

To insure that the flow through the die is not interrupted, the energizing of pistons 12, 13, 26 and 27 must be properly coordinated. The coordination between pistons 26 and 27 dictates the position of shuttle valve 30 according to the relative pressures exerted by each. The discharge piston, 12 or 13, for the next successive cycle must be energized concurrently with, or slightly before, the displacement of the shuttle valve so that material flows immediately from the filled chamber upon cutoff of the discharging chamber. This is most conveniently provided for by maintaining a constant discharge pressure on each of pistons 12 and 13 during the entire sequence of operations. The cylinder being discharged should not be completely depleted before actuating the valve, otherwise a discontinuity in the output may result. If a constant load is maintained on pistons 12 and 13 the procedure is simple to reverse the pressure on the pistons 26 and 27 when the discharge piston nears the bottom of its stroke. The remainder of the operation is fully automatic.

A continuous pressure in the exit flow path can be more nearly reached by designing the shuttle valve so that the discharge of the new cylinder begins before the valve cutoff for the previous discharge. As seen from FIG. 2 the displacement of the shuttle valve to the right begins to open port 15 immediately. With port 14 half closed, port 15 is half open. Consequently, there is no interruption in the flow of material into channel 18. Since the shuttle 30 can be displaced in a short duration and since the pressure drop is essentially entirely at the die head, this design feature is not essential to insuring a continuous flow. However, this expedient is preferred in preserving a very uniform extrusion pressure.

Although it is not essential to the operation of the device it is preferable that the feed channel 40 be disposed to communicate with the edge of the port 15 so that the fresh charge is forced past the remainder of the previous charge thereby permitting the older material to be extruded first. This eliminates hang-up of material which in many conventional designs results in degradation of a portion of the extrudate due to its long residence time. Alternatively, the feed channel 40 may communicate with a feed port which is separate from the discharge port 15 in which case the feed could be introduced into the upper portion of the feed container.

For illustrative purposes FIG. 1 shows solid feed material introduced directly into the feed arrangement from the hopper. However, in some cases it may be found preferable to pre-plasticize the material and introduce it in plastic form.

There are several alternative arrangements for the design and operation of the shuttle valve, which rely on the basic principles of this invention in obtaining their effectiveness from the alternating discharge of at least two feed chambers through a valve actuated automatically by the feed. For instance, several sequentially discharging feed containers may be employed with the shuttle valve communicating with each in sequence. The shuttle valve may be designed to pivot rather than slide as shown in FIG. 2.

Various other modifications and extensions of this invention will become apparent to those skilled in the art. All such variations and deviations which basically rely on the teachings through which this invention has advanced the art are properly considered within the spirit and scope of this invention.

What is claimed is:
1. A continuous flow extruder comprising
   at least two feed containers, each communicating with a single extrusion die through a valve assembly,
   said valve assembly comprising
   a valve slideable between a first position and a second position and having flow channels formed therethrough, such that the first position permits communication between a first feed container and said single extrusion die and the second position permits communication between a second feed container and the single extrusion die,
   valve actuating means comprising
   first and second feed channels each extending through said valve with each having an inlet communicating with a feed port, the first feed channel terminating in a blind exit when the said valve is in said first position such that pressure generated in the extrudate in said adjacent feed port urges said valve into said second position, the second feed channel operating vice-versa,
   first and second container feed conduits communicating respectively with said first and second feed channels such that when said valve is in said second position, said first container feed conduit connects the first feed channel with the first feed container and such that operation is vice-versa with respect to the second container feed conduit,
   first and second feeding means for introducing feed material alternately into said first and second feed ports, respectively, said first feeding means thereby urging said valve into said second position permitting the flow of feed material through said first feed channel and into said first feed container, said second feeding means operating vice-versa,
   first and second means operative concurrently with said second and first feeding means, respectively, said first means discharging the contents of said first feed container, under pressure, through said extrusion die, said second means discharging the contents of said second feed container, under pressure through said extrusion die,
   wherein said flow channels are disposed at a position relative to the feed containers such that the valve permits communication between the single extrusion die and the first and second feed containers simultaneously so that both feed containers are discharged simultaneously during the displacement of the valve from the first position to the second position.

2. The extruder of claim 1 wherein the said feed containers are cylinders and the means for discharging the containers are hydraulically operated pistons.

References Cited in the file of this patent
FOREIGN PATENTS
1,007,053    Germany _____ Apr. 25, 1957